Jan. 9, 1934.  J. WEINSTEIN  1,942,584
FILTER
Filed June 22, 1932
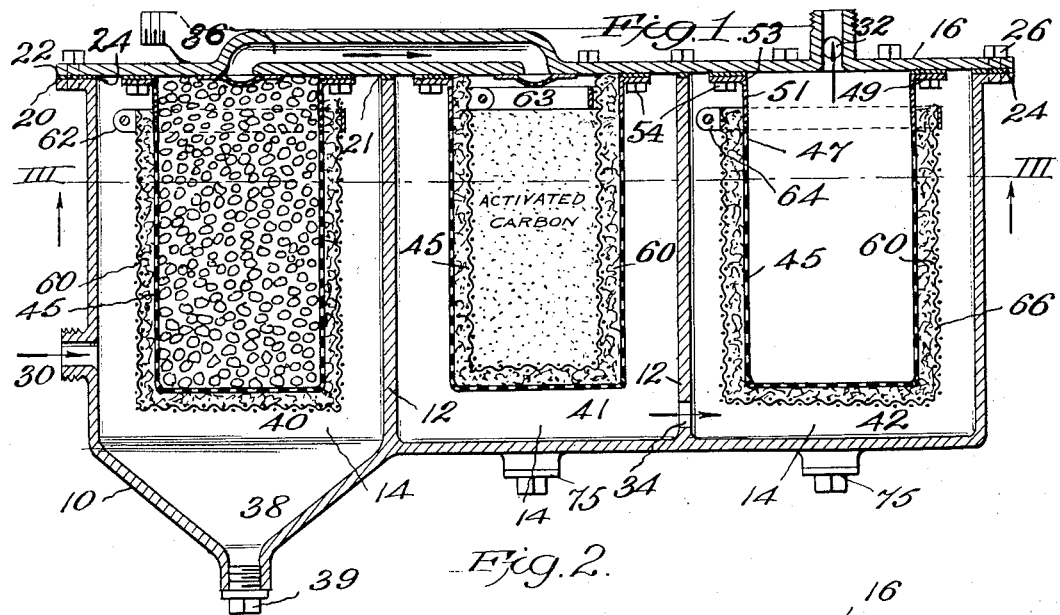
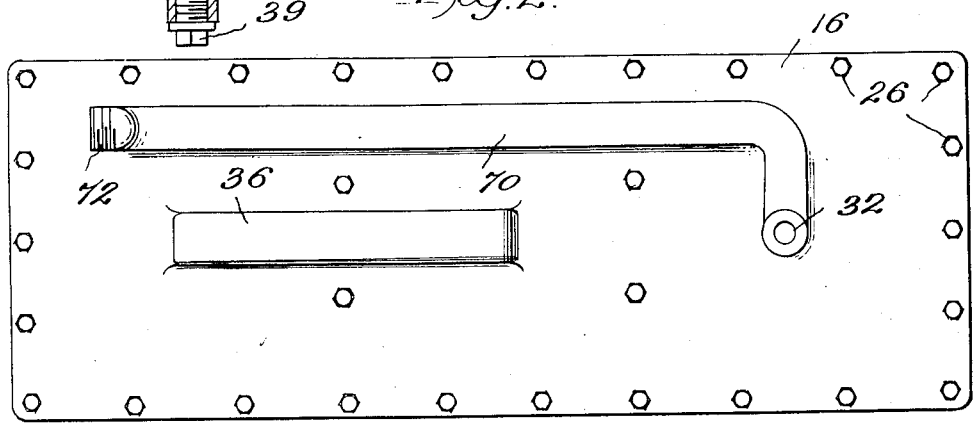
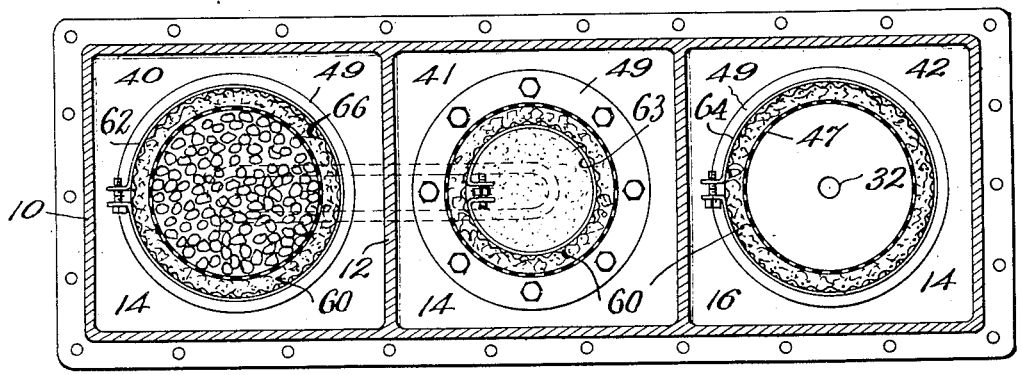
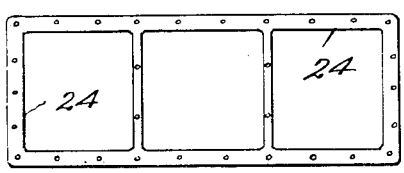

Patented Jan. 9, 1934

1,942,584

UNITED STATES PATENT OFFICE 1,942,584

FILTER

Joseph Weinstein, Jamaica, N. Y.

Application June 22, 1932. Serial No. 618,643

2 Claims. (Cl. 210—132)

This invention relates to filters and provides improvements therein.

The invention provides improvements in filters whereby the construction is simplified, and wherein secure and reliable packing is obtained at all joints where liquid might escape from the filter, and might pass through the filter without passing through the filtering means therein, or a portion of said means.

It further provides a filter well adapted for inexpert installation and maintenance.

It further provides a filter well adapted on account of its above recited features, to popular or large scale use, particularly in fields where such filters are desirable, but not heretofore largely or widely used, as for example household use. The grit, scale and sediment in water, even though the water is apparently clear to the eye, wears valves, wears water meters and makes them inaccurate, and causes damage in course of time to hot water heaters and steam boilers. A device well adapted for general use has economic value in the broad fields indicated above, and the present invention provides such a device. It is of course of utility wherever filters are used.

An embodiment of the invention is illustrated in the accompanying drawing, wherein:

Figure 1 is a longitudinal section through said embodiment.

Fig. 2 is a top plan view.

Fig. 3 is a longitudinal section on the line III—III, Fig. 1, looking in the direction of the arrows.

Fig. 4 is a plan view on a reduced scale of a skeleton gasket.

Referring to said drawing,

Numeral 10 designates the casing of the filter. This casing 10 is preferably a one-piece casing having an open top, and provided with partitions 12, dividing the casing into a plurality of compartments 14. Three compartments are here shown, arranged for serial flow, but any number of compartments, arranged for serial or multiple flow may be provided, as may be desired.

Numeral 16 designates the cover.

The edges 20 of the casing, and 21 of the partitions are preferably planed in a planer or by other suitable means so they will all lie flush in a single plane.

The cover is also provided with bearing portions 22 facing the edges 20 and 21 of the casing when the cover is in place. The bearing portions 22 on the cover are also preferably planed in a planer or other suitable device so that these bearing portions 22 all line in a single plane.

A skeleton gasket 24 (see Fig. 4) is provided to fit between the casing 10 and cover 16. By tightening the cover 16 down on the gasket 24, against the edges 20, 21 of the casing, a secure and reliable leak-tight closure of the casing is thereby provided. Bolts 26 serve to secure the cover 16 on the casing.

Numeral 30 designates a threaded opening for admitting fluid to the first compartment 14, and numeral 32 designates a similar outlet opening, which in the arrangement illustrated (three series compartments) is preferably provided in the cover.

Numeral 34 designates an opening in one of the partitions 12, where the flow is outwardly through one filter and inwardly through another filter, as hereinafter more fully explained.

Numeral 36 illustrates a duct leading from the filter in one compartment to a filter in another compartment, and hereinafter more fully explained. The duct 36 is preferably formed or cast as a part of the cover.

The bottom of the entering compartment 14 of the series is preferably made funnel-shaped, as indicated at 38, to act as a sump for the sediment, grit, etc. initially separated from the entering stream of liquid to be filtered, and a removable plug 39 is preferably provided in the portion 38 to admit of periodical cleaning out of the sediment etc. in said part 38.

The filtering means are shown at 40, 41, 42.

The said filtering means preferably comprise cupped supports 45, shown as deep cylindrical cups which may be formed readily by drawing or the like. The cups 45 are provided with a perforated portion 47, which preferably extends over a large portion of the surface area of the cup. Flanges 49 are preferably provided at the upper end of the cup. The portion of the cups adjacent the flanges 49, indicated at 51, is preferably solid or unperforated.

The cups 45 are made secure against leakage at their upper ends between the interior of the cup and the surrounding compartment 14. The leaktight joint is provided by means of a gasket 53 and bolts 54 which pass through the flange 49 and the gasket 53 and bind the flange 49 against the gasket 53 to the lower face of the cover 16.

Some or all of the cups 45 may be filled with clarifying or filtering material. As shown, the cup forming part of the filter 40 is filled with gravel, and the cup forming part of filter 41 is filled with activated carbon. The cup forming part of filter 42 is left empty. The cups 45 act as supports for filtering material. The filtering material is preferably fibrous, as for example loose or fibrous asbestos, as indicated at 60. The material 60 is arranged as a layer covering the perforated portion 47 of the respective cups, and preferably extending beyond the perforated portions so as to lap the unperforated portion 51. Suitable means, as straps 62, 63, 64, may be provided, adapted to surround the marginal portion of the layer of filtering material 60, and bind it securely against the unperforated portion 51 of the cup. By binding the material 60 against unperforated portion of the cup, leakage of liquid into the cup without being forced to pass through the filter is prevented. The means described provide a very simple, reliable and secure means of forcing all of the fluid to pass through the filtering material. A sheath of woven wire 66 may be provided around the layer of fibrous material 60 to hold it in place.

The filtering material 60 is preferably arranged on the outside of the cups forming parts of the filters 40 and 42, as in these instances the flow is toward the inside of the cups, and the pressure of the liquid is therefore in a direction to press the filtering material in secure position on the cups. The filtering material 60 is placed against the inside portion of the cup forming a part of the filter 41; in this instance the flow is from the inside of the cup outward, and again the pressure of the liquid assists in holding the filtering material in position against the sides of the cup. The binding straps 62, 64 act by compression as shown, and the binding strap 63 acts by expansion as shown.

A by-pass around the filter may be provided in part by a passage or duct 70 cast in and running across the cover 16. A threaded admission opening 72 is provided, and the openings 30 and 72 may be connected by suitable piping with a valve interposed in the piping between openings 30 and 72 in usual and well understood manner. The duct 70 conveniently connects at its outlet end with outlet opening 32. By closing the outlet 32, and opening the by-pass passage 70, and opening clean-out plugs 75 in the bottoms of compartments 42 and 41, water may be caused to flow reversely through cups 45 in compartments 42 and 41 and force accumulations of mud, etc. from the face of the filtering material.

*Operation*

The cups 45 are secured against the underside of the cover with the gaskets 49 sealing the joints. The layers of filtering material 60 are secured over the perforated portions 45 of the cups by means of the straps 62, 63, 64, as heretofore described. The cover with the filters 40, 41, 42 secured thereto is then fastened to the casing 10, the joint being sealed by the skeleton gasket 24. Each of the filters occupies a separate compartment 14. Liquid enters at 30. The coarser sediment, scale, etc. drops into the sump 38. The liquid flows through the filtering material 60, through the perforated cup 45, through the gravel, out through the open end of the cup into the duct 36 in the cover, and into the open end of the next cup 45 in series (filter 41). The liquid entering 41, flows through the activated carbon, then through the filtering material 60 and then into the middle compartment 14 through the perforated cup 45. From the middle compartment 14 the liquid flows through the opening 34 into the next compartment 14. From compartment 14 the liquid flows through the filtering material 60, and through the perforated portion of the cup 45 into the interior thereof. From the interior the clarified and filtered liquid flows out through the outlet opening 32.

In the household installations the filter is preferably joined to the house pipe ahead of the meter. The filter catches scale from the mains, grit and sediment in the water, and may also remove odors in passing through the activated carbon.

By reason of the removal of grit, scale and sediment, the wear on valves, meters and the like is virtually eliminated, and sediment in water backs and water legs of water heaters and furnaces is avoided, with consequent improved functioning and elimination of many troubles in the use of these devices.

The filter may be used for other purposes than that of filtering the water supply.

It will be perceived that the construction of the filter is such that it is very simply and easily put together, easily taken apart for replacements, etc., that all places where packing and tight joints are necessary are provided by secure, simple and reliable sealing means, and broad surfaces for packing are provided in all instances. Moreover, the parts are so disposed as to best function in relation to the direction of the pressure of the water on the parts of the filter.

The invention may receive other embodiments than that herein specifically illustrated and described.

What is claimed is:—

1. A filter comprising a casing having a plurality of compartments therein, a cover, and means for connecting said cover to said casing with a leak-tight seal, and filtering means in said compartments, said filtering means comprising a cupped support having a perforated portion, means connecting said cupped support to said cover with a leak-tight seal, and means for conducting liquid from one compartment to another through the filtering means therein, said conducting means being formed as a duct passing through the cover and communicating with the interiors of the cupped supports in serial flow relation.

2. A filter comprising a casing and partitions dividing the same into a plurality of compartments, said casing having its edges flush with the tops of said partitions, a cover having bearing portions facing the edges of said casing and of said partitions, a skeleton gasket between said edges and said bearing portions on the cover, means for securing said cover on the casing against the gasket, filtering means in said compartments, and liquid conducting means comprising a duct in the cover leading from the interior of one cupped support to the interior of another.

JOSEPH WEINSTEIN.